United States Patent [19]
Owen

[11] Patent Number: 5,142,692
[45] Date of Patent: Aug. 25, 1992

[54] TRANSMITTING INFORMATION WITH CUT AND FLIP SPECTRUM

[75] Inventor: Jeffrey R. Owen, Portland, Oreg.

[73] Assignees: Seiko Corp.; Seiko Epson Corp., both of Japan

[21] Appl. No.: 789,429

[22] Filed: Nov. 5, 1991

Related U.S. Application Data

[63] Continuation of Ser. No. 367,532, Jun. 16, 1989, abandoned.

[51] Int. Cl.$^5$ .............................................. H04B 1/02
[52] U.S. Cl. ............................................ 455/48; 455/45; 375/122
[58] Field of Search ...................... 455/42, 45, 48, 110, 455/113, 118, 47; 381/2-7, 14, 30, 31; 375/26, 60, 122; 340/825.44; 333/165, 167; 332/119

[56] References Cited

U.S. PATENT DOCUMENTS

| | | | |
|---|---|---|---|
| 2,898,397 | 8/1959 | Richman | 358/32 |
| 4,379,947 | 4/1983 | Warner | 455/45 |
| 4,594,607 | 6/1986 | Lewis, Jr. et al. | 358/27 |
| 4,870,480 | 9/1989 | Chao | 358/16 |
| 4,896,152 | 1/1990 | Tiemann | 375/122 |
| 5,063,610 | 11/1991 | Alwlapish | 455/45 |

Primary Examiner—Curtis Kuntz
Assistant Examiner—Edward Urban
Attorney, Agent, or Firm—Elmer Galbi

[57] ABSTRACT

The present invention provides a technique and system for modifying the modulation of the 66.5 kHz subcarrier in such a way that its spectrum will not overlap that required by the 57 kHz subcarrier, while at the same time maintaining compatibility with existing subcarrier receivers. A special signal is created whose spectral shape is asymmetrical with respect to the 66.5 kHz subcarrier. In the frequency domain, the lowest frequency part of the symmetrical spectrum is cut off, flipped about the carrier frequency and then added to the highest frequency part of the spectrum. This technique and system takes advantage of the fact that the receiver, with which the system is designed to operate, uses a sampling process which products frequency aliasing. With the present invention, the spectral shape produced at the transmitter is such that the aliasing caused by sampling in the receiver results in the lower-than-carrier and higher-than-carrier portions of the spectrum being adding together, producing in the receiver a symmetrical spectrum.

3 Claims, 4 Drawing Sheets

TRANSMITTING INFORMATION WITH CUT AND FLIP SPECTRUM

This application is a continuation of application Ser. No. 07/367,532, filed Jun. 16, 1989, now abandoned.

FIELD OF THE INVENTION

The present invention relates to radio transmission of information and more particularly to transmission of information using subcarriers on FM broadcast radio stations.

BACKGROUND

It is well know that information can be transmitted by means of a subcarrier contained on FM broadcast radio waves. Most FM broadcast radio stations use the baseband frequencies from 50 Hz to 53 kHz to transmit stereo program material. In such systems, the baseband frequencies from 53 kHz up to the legal maximum are available for the transmission of other information.

U.S. Pat. No. 4,713,808 (Gaskill) shows how paging information can be transmitted on a modulated subcarrier which has a symmetrical spectral shape. Such a system could use subcarrier centered at 66.5 kHz and extending symmetrically from 57 to 76 kHz. It would be desireable to have a world wide compatible paging network which utilizes the technologies described in the above reference patent and using the 57 to 76 kHz band; however, a conflict exists because there is an existing 57 kHz subcarrier on some European FM stations which uses the baseband frequencies from 54.6 kHz to 59.4 kHz.

The present invention provides a technique and system whereby both the 66.5 kHz subcarrier and the 57 kHz subcarrier can coexist on a single FM broadcast signal with only minimal interference from each other.

SUMMARY OF THE INVENTION

The present invention provides a technique and system for modifying the modulation of the 66.5 kHz subcarrier in such a way that its spectrum will not overlap that required by the 57 kHz subcarrier, while at the same time maintaining compatibility with existing subcarrier receivers. A special signal is created whose spectral shape is asymmetrical with respect to the 66.5 kHz subcarrier. In the frequency domain, the lowest frequency part of the symmetrical spectrum is cut off, flipped about the carrier frequency and then added to the highest frequency part of the spectrum. This technique and system takes advantage of the fact that the receiver, with which the system is designed to operate, uses a sampling process which produces frequency aliasing. With the present invention, the spectral shape produced at the transmitter is such that the aliasing caused by sampling in the receiver results in the lower-than-carrier and higher-than-carrier portions of the spectrum being adding together, producing in the receiver a symmetrical spectrum.

DETAILED DESCRIPTION

Figure 1:
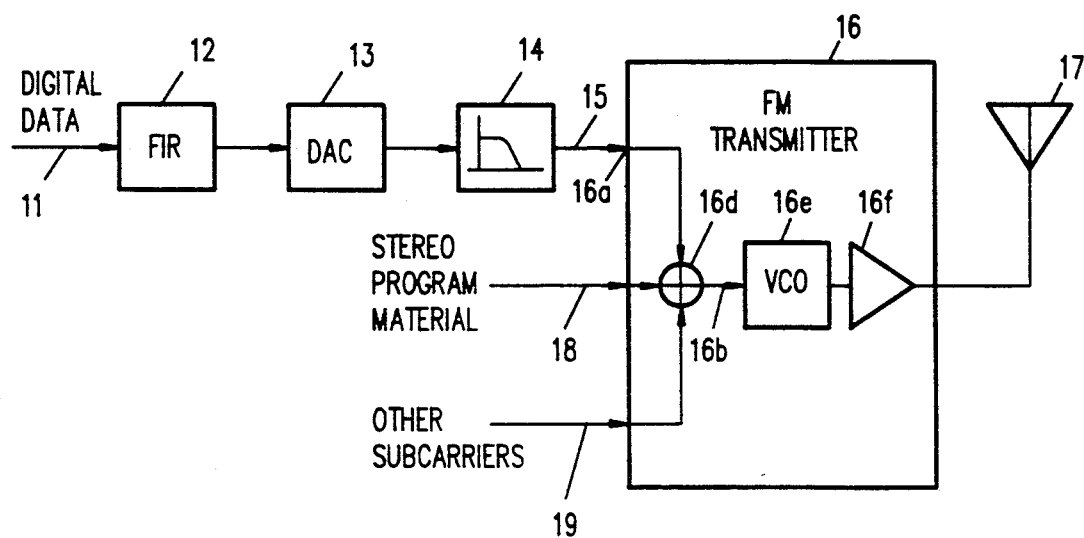
FIG. 1 is a block diagram of the transmission system used with the present invention.
Figure 2:
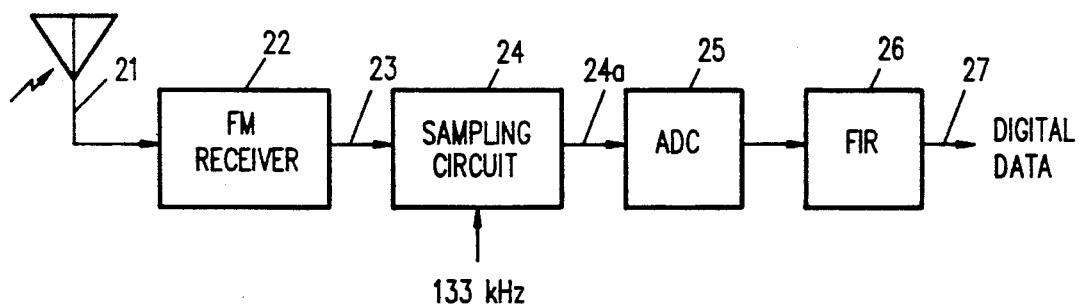
FIG. 2 is a block diagram of a receiver system used with the present invention.

The present invention is designed to operate in a system that includes a transmission system such as that shown in FIG. 1 and a receiver system such as that shown in FIG. 2. A system of the general type shown in FIGS. 1 and 2, which can utilize a subcarrier in the frequency band from 57 kHz to 76 kHz, is described in U.S. Pat. No. 4,713,808 (Gaskill), the description in which is hereby incorporated herein by reference. The specific problem which the present invention is designed to address is that in some European countries there is a preexisting subcarrier which utilizes the frequency band from 54.6 kHz to 59.4 kHz. The present invention allows both systems to coexist without conflict.

The transmission system shown in FIG. 1 includes the following: A digital data signal 11 is passed through a Finite Impulse Response (FIR) Filter 12 which has a certain frequency response, the characteristics of which will be described in detail later. The output of the FIR filter 12 is passed through a digital to analog converter (DAC) 13 and then a low pass filter 14, creating a band limited analogue subcarrier signal 15 which is then applied to the subcarrier input port 16a of a broadcast FM transmitter 16. As is conventional, transmitter 16 includes a summation circuit 16d, a voltage controlled oscillator 16e and an amplifier 16f. Radio frequency energy from the FM transmitter 16 is then broadcasted as FM radio waves by an antenna 17. Contained within the transmitter 16 is a signal termed the baseband signal 16b which consists of the summation of the subcarrier 15, the stereo program material 18, and any other subcarriers that may be present 19. Such transmitters and antennas are commercially available.

The receiver system shown in FIG. 2 includes the following: An antenna 21 for converting radio waves into electrical signals which are then amplified and demodulated by a conventional or unconventional FM receiver 22 capable of tuning over the range of the international FM broadcast bands. The output 23 of receiver 22, consists of the summation of the baseband signal 16b of the FM broadcast station plus noise and interference generated in the process of broadcasting and receiving. This signal 23 is then sampled at a rate of 133 kHz by the sampling circuit 24 and digitized by an analog to digital converter 25. After digitization, the signal is applied to an FIR filter 26 which has an appropriate passband so as to produce the desired digital data on its output 27. The details of the functional blocks in the receiver which form no part of the present invention, are not described further since there operation and construction can be understood by one skilled in the art. One example of a sampling circuit 24 that can be used is shown in copending patent application Ser. No.

07/304,526 filed Jan. 2, 1989 entitled *Integrate and Hold Amplifier*. The disclosure in this copending application is hereby incorporated by reference.

The present invention relates to the design of the spectrum of the subcarrier signal 15 that is transmitted by the system shown in FIG. 1 and received by the receiver system in FIG. 2. The spectrum of the subcarrier signal is designed to minimize the interference between two particular subcarrier signals. In particular, a subcarrier signal 15 whose spectrum normally extends from 57 kHz to 76 kHz is modified in such a way that it does not interfere with an existing subcarrier signal whose spectrum extends from 54.6 kHz to 59.4 kHz and yet is processed by the receiver system in FIG. 2 as if its spectrum was the normal unmodified spectrum.

Figure 3:
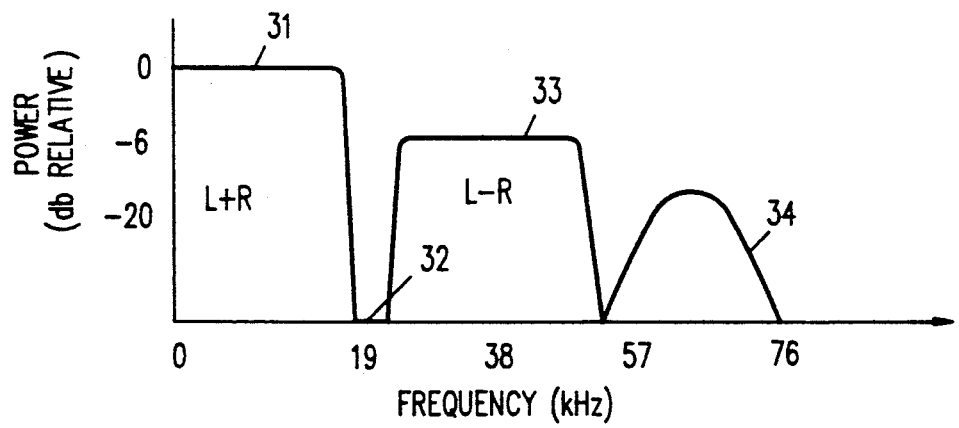
FIG. 3 is a diagram showing the baseband spectrum of a typical FM broadcast station.

FIG. 3 shows the spectrum of the baseband signal which exists when the only the normal subcarrier is present. The stereo program material is contained in three areas of the spectrum, left plus right 31, stereo pilot 32, and left minus right 33. Their function is common knowledge to one skilled in the art and is not described further herein. The normal subcarrier 34, as described in U.S. Pat. No. 4,713,808 (Gaskill), has a spectrum which is symmetric about its 66.5 kHz carrier frequency.

Figure 4:
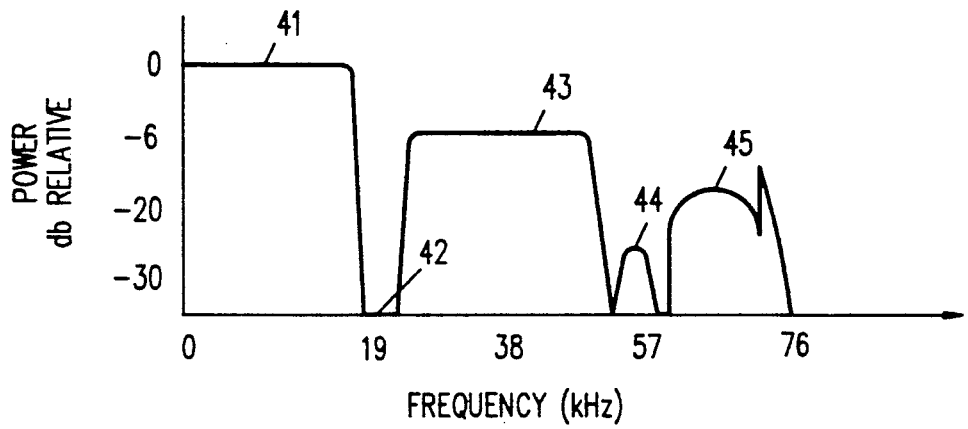
FIG. 4 is a diagram showing the baseband spectrum of a typical FM broadcast station containing both the 57 kHz subcarrier common in Europe as well as the modified 66.5 kHz subcarrier as described herein.

FIG. 4 shows the spectrum of the baseband signal which exists when both of the particular subcarriers are present. As in FIG. 3, the stereo program material is contained in three areas, 41, 42, and 43. The particular subcarrier whose spectrum extends from 54.6 kHz to 59.4 kHz is shown as area 44, while the modified subcarrier which is the subject of this invention is shown as area 45. This modified subcarrier has an asymmetrically shaped spectrum and occupies a frequency band from 61.25 kHz to 76 kHz.

The present invention takes advantage of the frequency aliasing that occurs whenever a continuous-time signal is converted into a discrete-time signal by means of a sampling process. Frequency aliasing is a phenomena whereby the entire frequency spectrum is divided into equal segments which are then superimposed creating a spectrum whose total domain has a bandwidth equal to that of the sampling rate. In a system such as that described herein where the sampling rate is 133 kHz, the finite domain for the spectrum of the discrete-time signal can be chosen to be from −66.5 to +66.5 kHz.

Figure 5A:
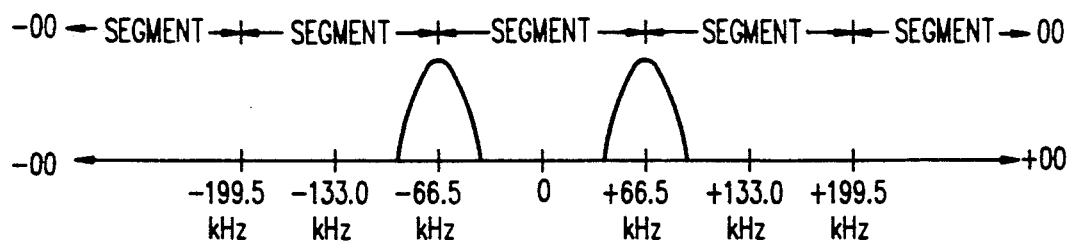
FIGS. 5a to 5e show the effect of the frequency aliasing caused by the sampling in the receiver on a symmetrical signal.
Figure 5B:
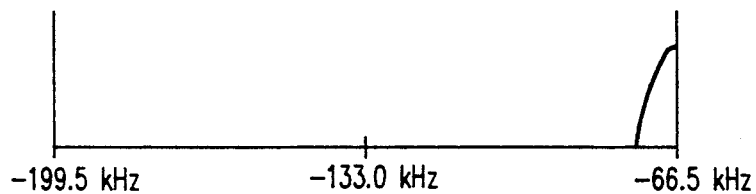
Figure 5C:
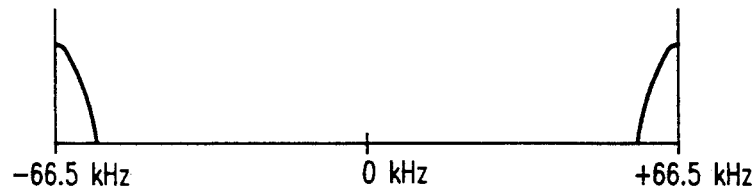
Figure 5D:
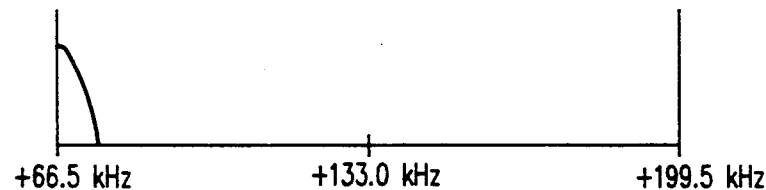
Figure 5E:
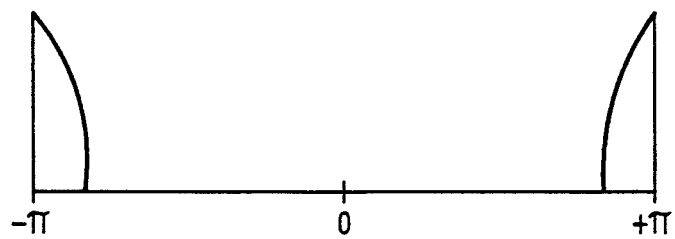

The effect of frequency aliasing on the normal signal with a symmetrical spectrum centered at 66.5 kHz which is sampled at 133 kHz is shown in FIGS. 5a to 5e. FIG. 5a shows the spectrum of the continuous-time signal and indicates the locations of the segments into which the entire spectrum will be divided. Although there are an infinite number of segments, only three contain any signal; from −199.5 to −66.5 kHz, from −66.5 to 66.5 kHz, and from +66.5 to +199.5 kHz. These segments are shown in FIGS. 5b, 5c and 5d, respectively. The spectrum of the discrete-time sampled signal is shown in FIG. 5e, and consists of the summation of the three segments shown in FIGS. 5b, 5c, and 5d.

As previously explained, the present invention is designed to operate in an environment where the spectrum from 54.6 to 59.4 kHz is occupied by an existing system. With the present invention, instead of having an FIR filter 12 generate a spectrum which is symmetrical with respect to the 66.5 kHz carrier and extends from 57 to 76 kHz, a spectrum is generated which is asymmetrical and extends from 61.25 to 76 kHZ. The shape of the spectrum is chosen and coordinated with the frequency aliasing action of sampling circuit 24 such that the signal produced at the sampling circuit output 24a, is identical to that which would have been produced if FIR filter 12 had generated the symmetrical spectrum extending from 57 to 76 kHz.

Figure 6A:
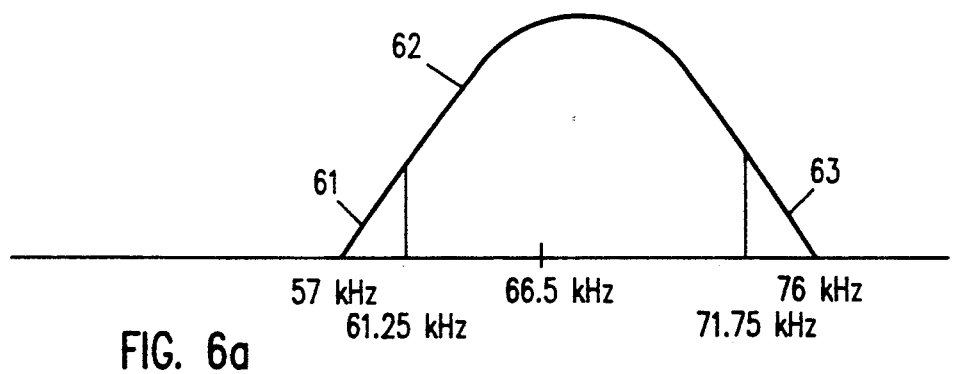
FIGS. 6a and 6b show the generation of the asymmetrical spectrum from the symmetrical spectrum.
Figure 6B:
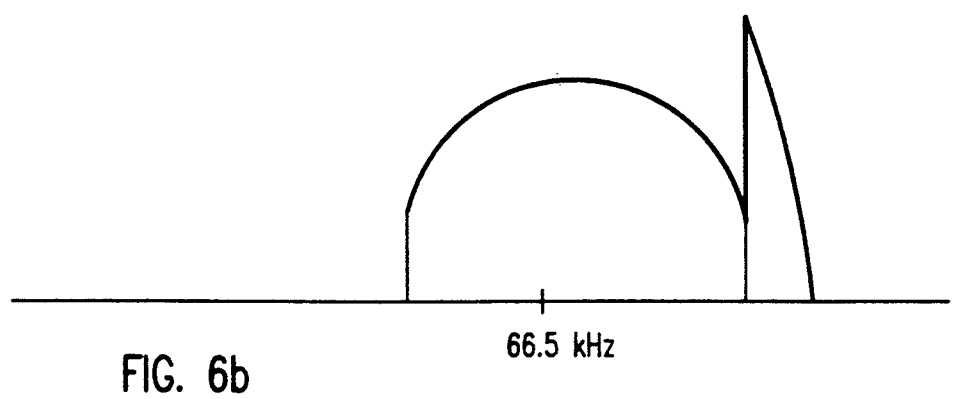

In order to understand the operation of the present invention, consider the positive frequency portion of the symmetrical spectrum centered at 66.5 kHz and divided into three parts 61, 62 and 63 as shown in FIG. 6a. Also consider that part 61 in the lower sideband is cut from the spectrum, and then flipped about the 66.5 kHz axis and added to part 63 in the upper sideband as shown in FIG. 6b. Since parts 61 and 63 are mirror images of each other this cut-an-flip operation has the effect of eliminating all of the frequencies from 57 to 61.25 kHz and doubling the amplitudes of all frequencies from 71.75 to 76 kHz.

Figure 7A:
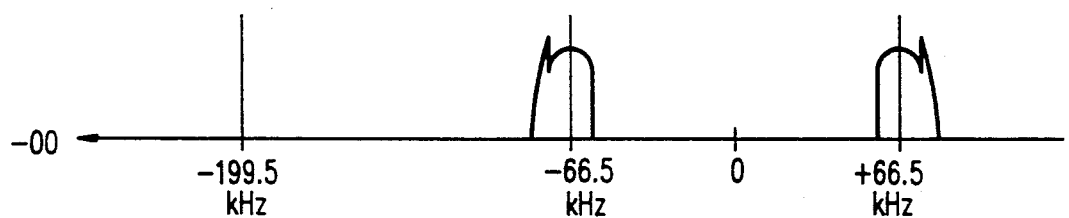
FIGS. 7a to 7e show the effect of the frequency aliasing caused by the sampling in the receiver on an asymmetrical signal constructed in accordance with the present invention.
Figure 7B:
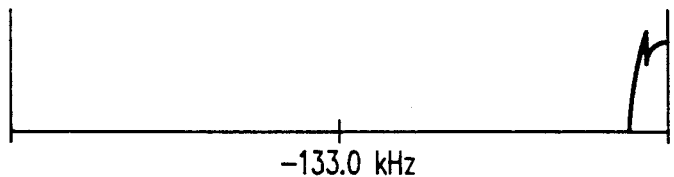
Figure 7C:
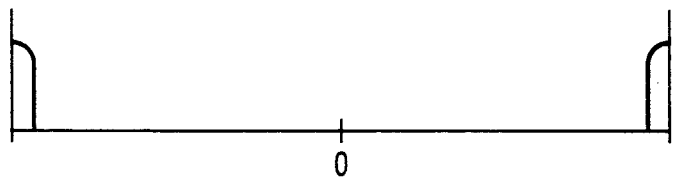
Figure 7D:
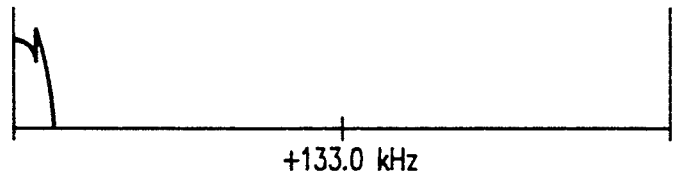
Figure 7E:
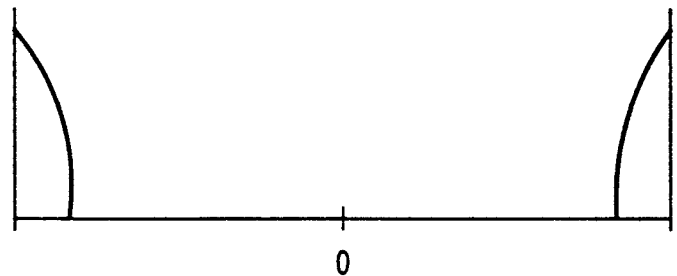

When such a signal is transmitted, received and sampled, the phenomena of frequency aliasing will occur as previously explained. The effect of frequency aliasing on the signal with the chosen asymmetrical spectrum which is sampled at 133 kHz is shown in FIGS. 7a to 7e. FIG. 7a shows the spectrum of the continuous-time signal and indicates the locations of the segments into which the entire spectrum will be divided. Although there are and infinite number of segments, only three contain any signal; from −199.5 to −66.5 kHz, from −66.5 to 66.5 kHz, and from +66.5 to +199.5 kHz. These segments are shown in FIGS. 7b, 7c and 7d, respectively. The spectrum of the discrete-time sampled signal is shown in FIG. 7e, and consists of the summation of the three segments shown in FIGS. 7b, 7c, and 7d. Because of the way in which the asymmetrical spectrum was designed, the spectrum of the sampled signal shown in FIG. 7e is identical to that shown in FIG. 5e.

Thus using the present invention, a world wide paging system such as that shown in the previously referenced patent application, which normally uses the frequencies from 57 to 76 kHz can be implemented. On FM broadcast stations where the frequencies from 54.6 to 59.4 kHz are already occupied by an existing subcarrier, the FIR filter in the transmitter 12 can utilize the previously described asymmetrical spectrum so that there will be no interference with the existing subcarrier. No change is necessary in the receivers.

The relationship that must exist for the present invention to operate is that the sampling rate must be approximately twice the carrier frequency. In this way the parts of the spectrum of appropriately superimposed.

While the invention has been described with reference to a preferred embodiment thereof, it will be understood by those skilled in the art that various changes in form and details may be made without departing from the scope of the invention.

Furthermore, invention, those skilled in the art will recognize a wide variety of applications for the method and system heretofore described. Such variations which use my invention are meant to fall within the following claims.

I claim:

1. A radio paging system wherein paging messages are transmitted from an FM transmitter to paging receivers via signals carried on the subcarrier of an FM radio signal having a first frequency, said radio paging receivers having a signal sampling means which operates at twice said first frequency, including in combination:
- filter means associated with said FM transmitter, said filter means having an input and an output, said filter means having an asymmetrical frequency response with respect to the subcarrier including means for cutting off a portion of one of the sidebands, flipping it about the subcarrier frequency and adding it to the corresponding portion of the other sideband,
- means for providing paging messages to the input of said filter
- means connecting the output of said filter means to the subcarrier input of said FM transmitter,
- whereby aliasing caused by said sampling means in said receiver causes the output of said receiver to appear as if the filter in the transmitter has a symmetrical spectrum.

2. A radio transmission system wherein messages are transmitted from an FM transmitter to receivers via signals carried on the subcarrier of an FM radio signal having a first frequency, the combination of:
- sampling means in said radio receivers having a signal sampling means which operates at twice said first frequency, said sampling means causing aliasing,
- filter means associated with said FM transmitter, said filter means having an input and an output, said filter means having an asymmetrical frequency response with respect to the subcarrier including means for cutting off a portion of one of the sidebands, flipping it about the subcarrier frequency and adding it to the corresponding portion of the other sideband,
- means for providing messages to the input of said filter
- means connecting the output of said filter means to the subcarrier input of said transmitter,
- whereby aliasing caused by said sampling means in said receivers causes the output of said receiver to appear as if the filter in the transmitter has a symmetrical spectrum.

3. A technique for transmitting information in a radio paging system wherein paging messages are transmitted from an FM transmitter to paging receivers via signals carried on the subcarrier of an FM radio signal having a first frequency, said radio paging receivers having a signal sampling means which operates at twice said first frequency, including in combination:
- providing paging messages,
- passing said paging messages through filter means associated with said FM transmitter, said filter means having an input and an output, said filter means having an asymmetrical frequency response with respect to the subcarrier including means for cutting off a portion of one of the sidebands, flipping it about the subcarrier frequency and adding it to the corresponding portion of the other sideband,
- supplying the output of said filter means to the subcarrier input of said FM transmitter,
- whereby aliasing caused by said sampling means in said receiver causes the output of said receiver to appear as if the filter in the transmitter has a symmetrical spectrum.

* * * * *